(12) United States Patent
Romeu et al.

(10) Patent No.: US 12,679,546 B2
(45) Date of Patent: Jul. 14, 2026

(54) PARACHUTE WITH IMPROVED GLIDING FEATURES

(71) Applicant: Alluvionic, Inc., Melbourne, FL (US)

(72) Inventors: Ricardo Romeu, Melbourne, FL (US); Mark Boomgaarden, Cary, NC (US)

(73) Assignee: Alluvionic, Inc., Melbourne, FL (US)

( * ) Notice: Subject to any disclaimer, the term of this patent is extended or adjusted under 35 U.S.C. 154(b) by 0 days.

(21) Appl. No.: 18/953,715

(22) Filed: Nov. 20, 2024

(65) Prior Publication Data

US 2026/0138747 A1     May 21, 2026

Related U.S. Application Data

(60) Provisional application No. 63/584,023, filed on Sep. 20, 2023.

(51) Int. Cl.
B64D 17/02 (2006.01)

(52) U.S. Cl.
CPC .................................. B64D 17/025 (2013.01)

(58) Field of Classification Search
CPC ...... B64D 17/00; B64D 17/02; B64D 17/025; B64D 17/14; B64D 17/18
See application file for complete search history.

(56) References Cited

U.S. PATENT DOCUMENTS

| | | | | |
|---|---|---|---|---|
| 4,175,722 A | * | 11/1979 | Higgins | B64D 17/025 |
| | | | | 244/152 |
| 4,771,970 A | * | 9/1988 | Sutton | B64D 17/025 |
| | | | | 244/152 |
| 5,174,528 A | * | 12/1992 | Puskas | B64D 17/025 |
| | | | | 244/145 |
| 6,889,942 B2 | * | 5/2005 | Preston | F42B 10/56 |
| | | | | 244/152 |
| 6,929,221 B2 | * | 8/2005 | Preston | B64D 17/10 |
| | | | | 244/152 |
| 7,172,158 B2 | * | 2/2007 | Preston | B64C 31/036 |
| | | | | 244/145 |
| 9,573,691 B1 | * | 2/2017 | Sadeck | B64D 17/025 |
| 2011/0260004 A1 | * | 10/2011 | Mullins | B64D 17/025 |
| | | | | 244/146 |

(Continued)

FOREIGN PATENT DOCUMENTS

| | | | | | |
|---|---|---|---|---|---|
| GB | 2170156 A | * | 7/1986 | ........... | B64D 17/025 |

*Primary Examiner* — Justin M Benedik

(74) *Attorney, Agent, or Firm* — Daniel C. Pierron; Widerman Malek, PL

(57) ABSTRACT

A ram-air parachute system is presented. The system may include upper and lower airfoil surface members and one or more proximal wall members, distal wall members, interior wall members, and proximal-facing air inlets. The proximal-facing air inlets may be defined between the interior wall members and the upper and lower airfoil surface members. One or more edge airfoils may be defined between the proximal wall members and at least a portion of the upper airfoil surface member, the lower airfoil surface member and the distal wall member(s). The edge airfoils may be in fluidic communication with the proximal-facing air inlet such that air may flow into the edge airfoils via the proximal-facing air inlet and inflate the edge airfoils. Inflation of the edge airfoils may vertically expand the parachute system, increasing a vertical distance between the upper and lower airfoil surface members.

20 Claims, 15 Drawing Sheets

100

(56) References Cited

U.S. PATENT DOCUMENTS

| | | | |
|---|---|---|---|
| 2011/0261499 A1* | 10/2011 | Hizer | H01T 23/00 |
| | | | 361/231 |
| 2013/0056241 A1* | 3/2013 | Gao | B03C 3/41 |
| | | | 427/125 |
| 2015/0129276 A1* | 5/2015 | Shumaker | H01B 3/441 |
| | | | 174/69 |
| 2016/0264248 A1* | 9/2016 | MacCallum | B64D 17/26 |

* cited by examiner

PARACHUTE WITH IMPROVED GLIDING FEATURES

RELATED APPLICATIONS

This application claims priority under 35 U.S.C. § 119(e) of U.S. Provisional Patent Application Ser. No. 63/584,023 filed on Sep. 20, 2023, and titled Parachute with Improved Gliding Features. The content of this application is incorporated herein by reference.

FIELD OF THE INVENTION

The present invention relates to systems and methods for a parachute that utilizes electroaerodynamic thrust.

BACKGROUND OF THE INVENTION

Parachute systems are generally well known in the art. Parachutes available by the prior art each have their own costs, benefits, weaknesses, and specific applications. For example, each of the parachutes of the prior art vary in capabilities for flight duration, controllability, reliability and overall performance. However, the prior art fail to provide a parachute that is able to achieve high levels of performance in each of the aforementioned areas or provide satisfactory capabilities in a variety of instances or uses. For example, the prior art fail to provide a parachute system capable of, or satisfactorily capable of, operating at a variety of altitudes, flight times, travel distances, temperatures and weather conditions, having high maneuverability and agility, avoidance of obstacles, handling turbulence, and while also providing enhanced user safety and comprising a low total weight.

The prior art have attempted to implement improvements by including propulsion systems in a parachute. However, the propulsion systems used by the prior art are heavy, loud, cumbersome, and include moving mechanical parts that pose a high danger potential for users of the parachute for being injured by the operation of the propulsion system or by being struck by the propulsion system itself when landing with the parachute.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a ram-air parachute system. The system may include upper and lower airfoil surface members and one or more proximal wall members, distal wall members, interior wall members, and proximal-facing air inlets. The proximal wall members may extend between proximal edges of the upper and lower airfoil surface members. Each proximal wall member may extend distally and away from a longitudinal center of the parachute system. The distal wall member(s) may extend between distal edges of the upper and lower airfoil surface members.

The interior wall members may be positioned within a space at least partially bounded by the upper and lower airfoil surface members, the proximal wall members and the at least one distal wall member. The interior wall members may be positioned distal to one of the proximal wall members and may extend distally and away from the longitudinal center of the parachute system. The proximal-facing air inlets may be defined between the interior wall members and the upper and lower airfoil surface members.

Edge airfoils may be defined between the proximal wall members and at least a portion of the upper airfoil surface member, the lower airfoil surface member and the distal wall member(s). The edge airfoils may be in fluidic communication with the proximal-facing air inlet such that air may flow into the edge airfoils via the proximal-facing air inlet and inflate the edge airfoils. Inflation of the edge airfoils may vertically expand the parachute system, increasing a vertical distance between the upper and lower airfoil surface members.

Some embodiments of the present invention may include one or more central wall members that may be positioned within a space at least partially bounded by the upper and lower airfoil surface members and a distal portion of the interior wall member. A portion of the central wall members may be positioned distal to one of the proximal wall members and may extend distally and substantially parallel to the longitudinal center of the parachute system. A central airfoil may be defined between adjacent proximal wall members and at least a portion of the central wall members, the upper airfoil surface member, and the lower airfoil surface member. The central airfoil may be in fluidic communication with the proximal-facing air inlet such that air may flow into the central airfoil via the proximal-facing air inlet and inflate the edge airfoils. Inflation of the edge airfoils facilitates may vertically expand the parachute system in conjunction with inflation of the edge airfoils.

Some embodiments of the present invention may include a first conductor, a second conductor, and control circuitry. The first conductor may be positioned within an edge airfoil of the plurality of edge airfoils, and the second conductor may be positioned within the same edge airfoil as the first conductor at a position that may be distal the first conductor. The control circuitry may be connected to each of the first and second conductors and may be configured to positively charge the first conductor and negatively charge the second conductor.

Air particles adjacent to the first conductor may be ionized by the positive charging thereof and may be attracted to the second conductor by the negative charging thereof, which may create a distal flow of air into and out of the edge airfoil. Each edge airfoil of the plurality of edge airfoils may include a first conductor, a second conductor, and control circuitry. The first conductor may comprise a wire of conductive material, and the second conductor may comprise a film of conductive material. An airflow housing may be positioned within the same edge airfoil as the first and second conductors. The first conductor and the second conductor may be housed by the airflow housing.

Each airflow housing may comprise at least two airflow openings positioned extending from an interior area of the airflow housing through a lower portion of the airflow housing. One of the airflow openings may be proximate to a first end of the airflow housing, and another one of the airflow opening may be proximate to a second end of the airflow housing. Some embodiments of the present invention may include a third conductor and a fourth conductor. The third conductor may be positioned within the same edge airfoil as the first and second conductors at a position distal the second conductor. The fourth conductor may be positioned within the same edge airfoil as the first, second, and third conductors at a position distal the third conductor. The control circuitry may be further configured to positively charge the third conductor and negatively charge the fourth conductor. Air particles adjacent to the third conductor may be ionized by the positive charging thereof and may be attracted to the fourth conductor by the negative charging thereof, which may supplement the distal flow of air into and out from the edge airfoil. The first, second, third, and fourth conductors may each be housed by an airflow housing.

In some embodiments of the present invention, the control circuitry connected to each of the first and second conductors may be configured to positively charge one of the first conductors and the second conductors, and to negatively charge the other of the first conductors and the second conductors, such that air particles adjacent to the positively-charged conductors may be ionized by the positive charging thereof and may be attracted to the negatively-charged conductors adjacent to the positively-charged conductors by the negative charging thereof, creating a distal flow of air into and out from the plurality of edge airfoils and the central airfoil.

In some embodiments of the present invention the lower airfoil surface member may comprise at least one detachable panel. Detachment of the at least one detachable panel may create at least one opening in the lower airfoil surface member to permit at least one of installment and removal of at least one airflow control device within at least one of the plurality of edge airfoils. The lower airfoil surface member may be fabricated at least partially from a metamaterial configured to contract when a current is applied thereto. The control circuitry may be operable to selectively and/or temporarily apply current to the lower airfoil surface member to cause the lower airfoil surface member to contract, thereby imparting an inverted-U shape to the parachute system, and then cease applying current, permitting the lower airfoil surface member to return to its uncontracted state.

Some embodiments of the present invention may include a motor and control lines. A first control line may be attached at a first end to the motor and at a second end towards a first lateral end of the parachute system. A second control line may be attached at a first end to the motor and at a second end towards a second lateral end of the parachute system opposite the first lateral end. The motor may be operable selectively retract each of the first and second control lines, thereby applying a downward force on the lateral ends of the parachute system to impart an inverted-U shape, and then release the retracted first and second control lines to permit the parachute system to return to its contracted shape.

In some embodiments, the distal wall member may comprise one or more apertures positioned at a distal end of the plurality of edge airfoils and may be configured to permit selective venting of air in the edge airfoil adjacent thereto. Some embodiments of the present invention may include one or more inflatable winglets. A first inflatable winglet may be positioned at a first lateral end of the parachute system, and a second inflatable winglet may be positioned at a second lateral end of the parachute system. A plurality of airflow control devices may be positioned between one of the first and second inflatable winglets and the edge airfoils adjacent the first and second winglets. The airflow control devices may be configured to selectively permit air to flow into the first and second inflatable winglets from the edge airfoil adjacent thereto.

A method aspect of the present invention may be directed to a method of operating an embodiment of the ram-air parachute system. The method may comprise polarizing one of the first and second conductors to have a positive polarity, thereby ionizing air particles adjacent thereto, and polarizing the other of the first and second conductors to have a negative polarity, thereby attracting the ionized air particles. The method may also include establishing a flow of air in the edge airfoil through polarization of the first and second conductors, and vertically expanding the edge airfoils through air flowing into the proximal-facing inlet and into the edge airfoils, thereby inflating the edge airfoils and increasing a vertical distance between the upper and lower airfoil surface members. The method may also include performing a flapping procedure of the ram-air parachute system to selectively contract and expand the edges of the ram-air parachute system towards and away from a central axis of the ram-air parachute system.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a parachute system having improved gliding features by including a plurality of airflow control devices utilized to provide an electroaerodynamic thrust in a rearward and/or downward direction to cause an upward and/or forward directed force on the parachute body to encourage a forward movement of the parachute system 100 and to provide increased gliding capabilities.

Figure 1:
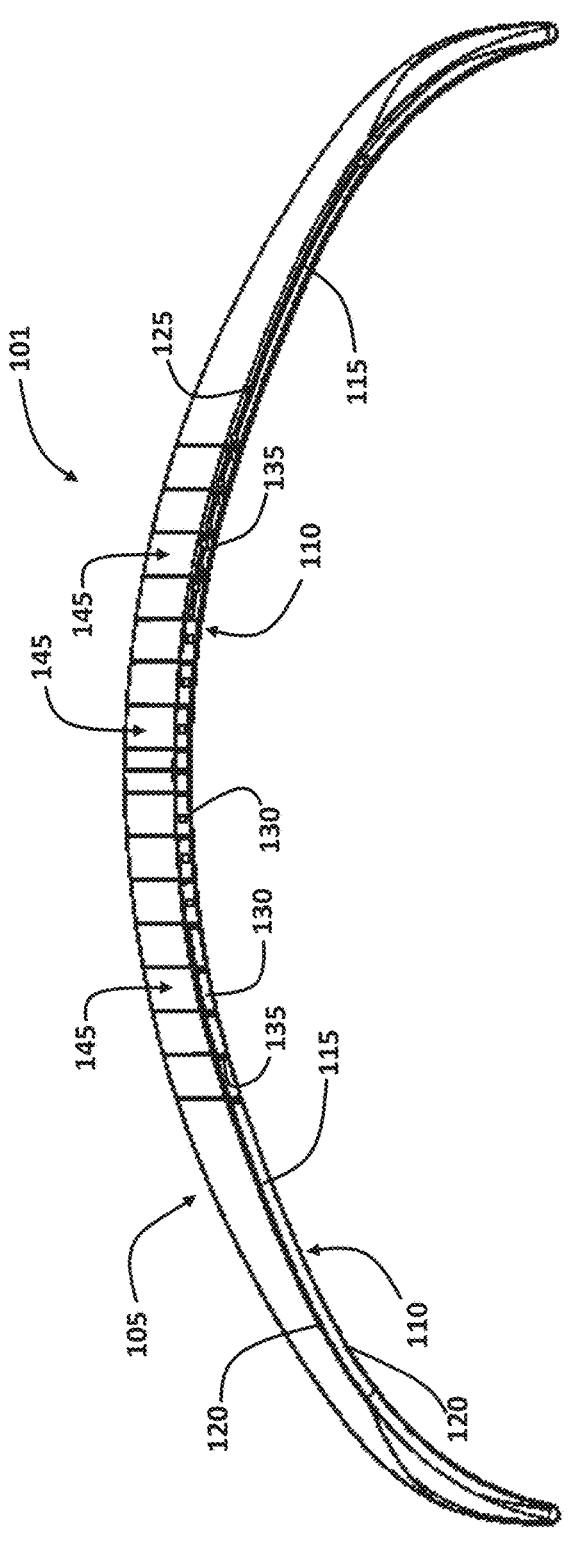
FIG. 1 is a front elevation view of a parachute system according to an embodiment of the present invention.
Figure 2:
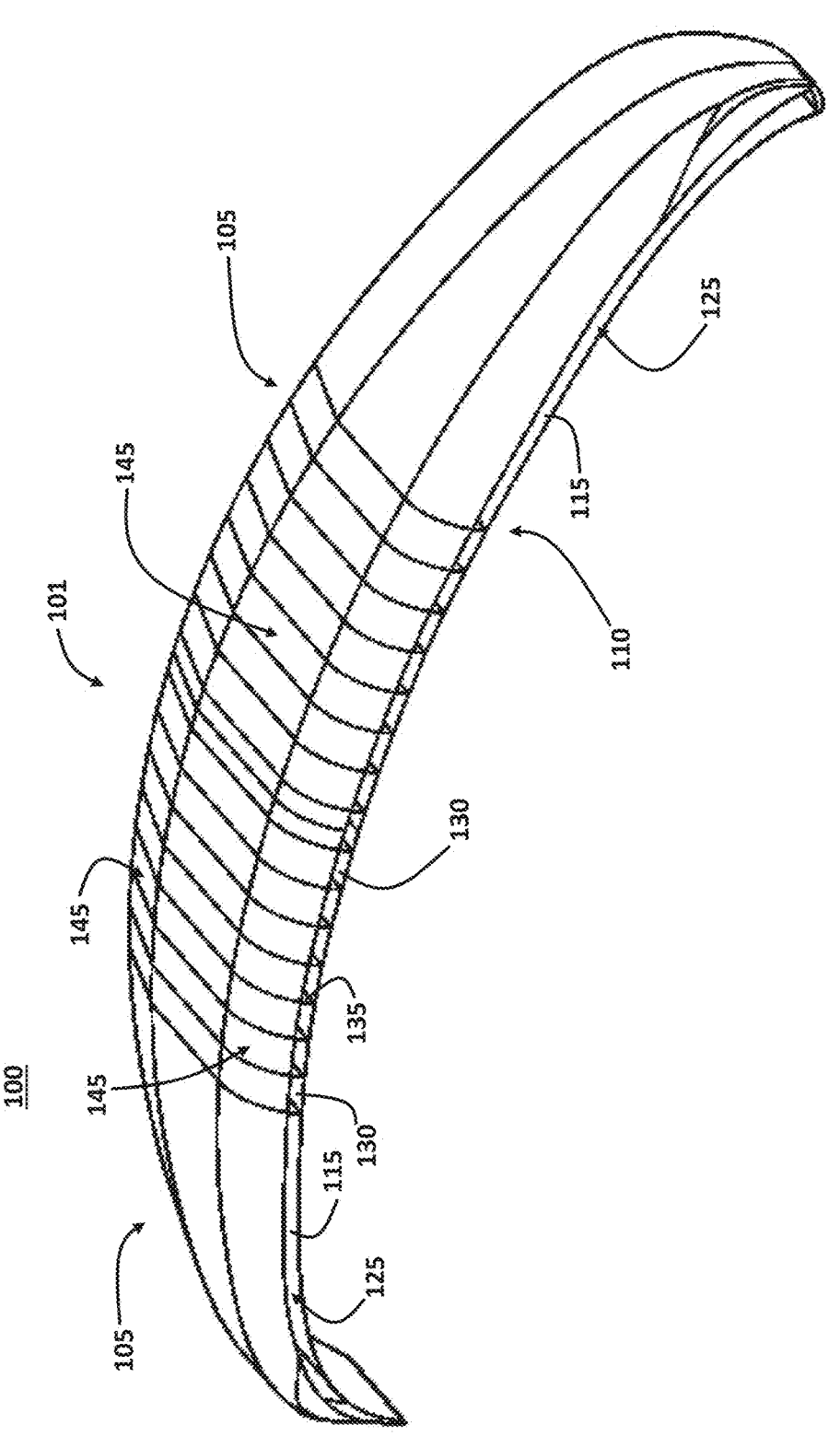
FIG. 2 is an elevated perspective view of the parachute system according to FIG. 1.
Figure 3:
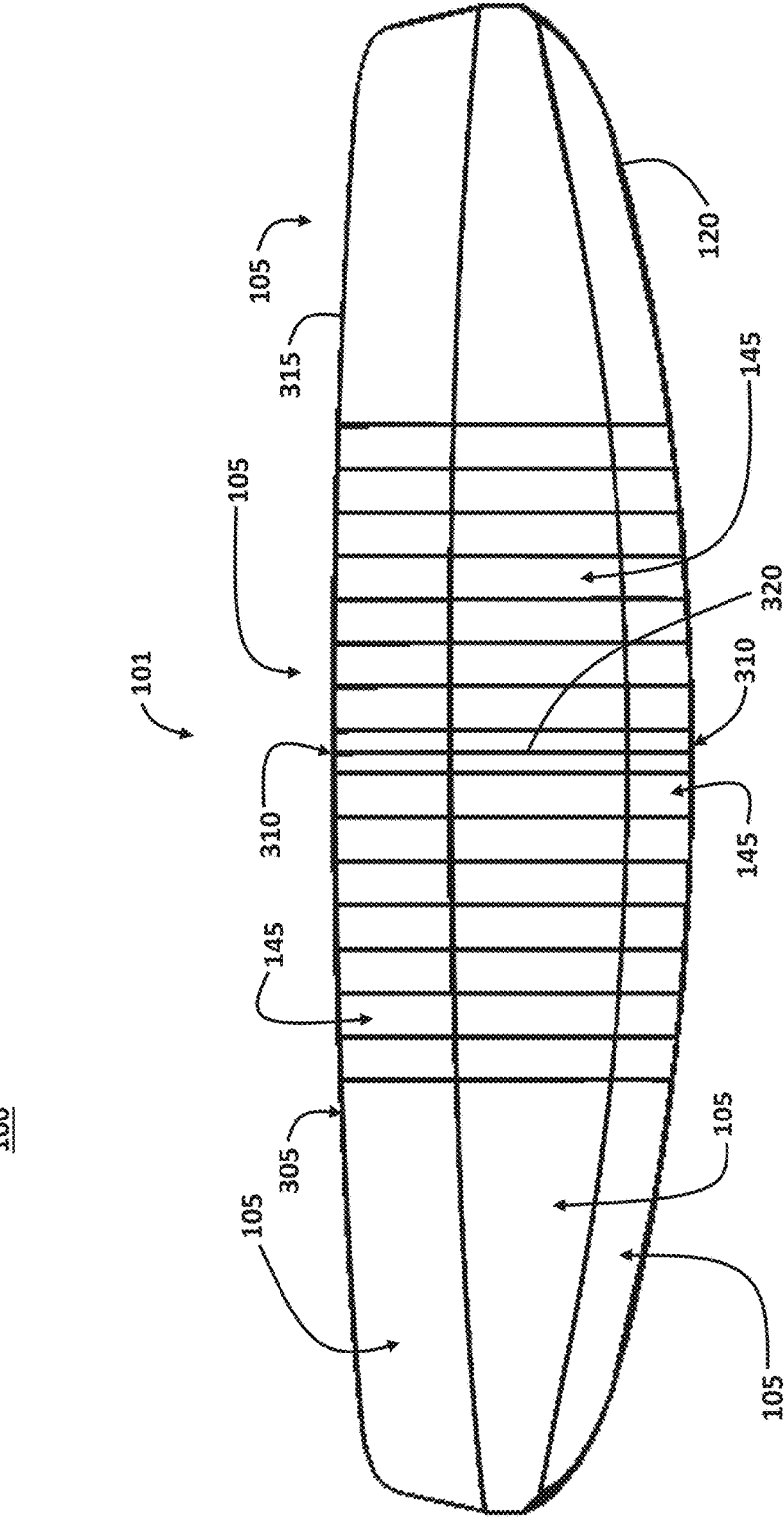
FIG. 3 is a top plan view of the parachute system according to FIG. 1.

Initially referring to FIGS. 1-3, an embodiment of a parachute system 100 according to an embodiment of the invention is presented. The parachute system 100 may include a parachute body 101. The parachute body 101 may include an upper airfoil surface member 105, a lower airfoil surface member 110, proximal wall members 115, closed proximal faces 125, a distal wall member 305, interior wall members 135, proximal-facing air inlets 130, and/or edge airfoils 145. The proximal wall members 115 may extend between proximal edges 120 of the upper airfoil surface member 105 and the lower airfoil surface member 110. The proximal wall members 115 may extend distally and/or away from a longitudinal center of the parachute system 100 and/or the parachute body 101.

The distal wall member 305 may extend between distal edges 315 of the upper airfoil surface member 105 and the lower airfoil surface member 110. The distal wall member 305 may include one or more apertures positioned proximate a distal end of the plurality of edge airfoils 145 which may be configured to permit selective venting of air in the edge airfoil 145 adjacent thereto. The interior wall members 135 may be positioned within a space that may be at least partially bounded by the upper airfoil surface member 105, the lower airfoil surface member 110, the proximal wall members 115 and/or the distal wall members 305. The interior wall members 135 may extend distally and/or away from the longitudinal center of the parachute system 100 and/or of the parachute body 101. Also, the interior wall members 135 may extend between the proximal edges 120 and the distal edges 315 of the upper airfoil surface member 105 and the lower airfoil surface member 110.

The proximal-facing air inlets 130 may be defined between of the interior wall members 135, the upper airfoil surface member 105, and/or the lower airfoil surface member 110. The edge airfoils 145 may be defined between the proximal wall members 115, the interior wall members 135, the upper airfoil surface member 105, the lower airfoil surface member 110, and the distal wall members 305. The edge airfoils 145 may be in fluidic communication with one or more of the proximal-facing air inlets 130 such that air may flow into the edge airfoils 145 via the proximal-facing air inlets 130 and inflate the edge airfoils 145 and/or the parachute body 101. Without limitation, such air may be interchangeably and/or alternatively referred to as ram air 651.

Inflation of the edge airfoils 145 may vertically expand the parachute system 100 and/or the parachute body 101, which may cause an increase in a vertical distance between the upper airfoil surface member 105 and the lower airfoil surface member 110. In some embodiments of the present invention, the system 100, the parachute body 101, and/or the edge airfoils 145 may include a central edge airfoil 310. The system 100 and/or the interior wall members 135 may include at least one central wall member 320 that may extend distally and/or away from a longitudinal center of the central edge airfoil 310.

The central wall member(s) 320 may be positioned within a space at least partially bounded by the upper and lower airfoil surface members 105, 110 and a distal portion of the interior wall member(s) 135. At least a portion of the central wall member(s) 320 may be positioned distal to one of the proximal wall members 115 and may extend distally and substantially parallel to the longitudinal center of the system 100.

The central edge airfoil 310 may be defined between adjacent proximal wall member(s) 115, and/or at least a portion of the central wall member(s) 320, and/or at least a portion of the upper airfoil surface member 105 and the lower airfoil surface member 110. The central edge airfoil 310 may be in fluidic communication with one or more of the proximal-facing air inlet(s) 130 such that air may flow into the central edge airfoil 310 via the proximal-facing air inlet(s) 130 and inflate one or more of the edge airfoils 145, 310. Inflation of the edge airfoils 145, 310 may facilitate vertically expanding the system 100 and/or parachute body 101 in conjunction with inflation of the edge airfoils 145, 310.

Now referring to FIGS. 4-7, 11, and 14, embodiments of the system 100 may include one or more airflow control devices 405 and a control system 1400. The control system 1400 may include one or more control circuitry 610. The control circuitry 610 may comprise one or more control units 1401, power units 1402, sensor units 1403, and/or input units 1404. For the purposes of the description of the embodiments of the present invention herein, it should be understood that the "control circuitry" and/or the "control system" may refer to any one or more of the control unit(s) 1401, the power unit(s) 1402, the sensor unit(s) 1403, and/or the input unit(s) 1404 individually, collectively, and/or any combination(s) thereof, without any limitation.

The control circuitry 610 may be mounted on and/or carried by one or more of the parachute body 101, the upper airfoil surface member 105 and/or the lower airfoil surface member 110. The control circuitry 610 may be at least partially mounted on the lower airfoil surface member 110 and/or carried by the parachute body 101 adjacent to one or more proximal edge(s) 120 of the upper and lower airfoil surface members 105, 110 and/or adjacent to one or more distal edge(s) 315. Also, one or more of the control circuitry 610 may be mounted on and/or carried by one or more of the airflow control devices 405. Some embodiments of the present invention may include one or more of a motor 1150 and/or a pack unit 1112, and the control circuitry 610 may be at least partially mounted on and/or carried by the pack unit 1112. Also, some embodiments of the present invention may include, and/or the parachute body 101, upper airfoil surface member 105 and/or the lower airfoil surface member 110 may comprise a metamaterial 550.

One or more of the control circuitry 610 may be in communication with the airflow control devices 405, the metamaterial 550, and/or the motor(s) 1150. Also, one element of the control circuitry 610 may be in communication with another element of the control circuitry 610. For example, without limitation, one or more of the control unit(s) 1401, the power unit(s) 1402, the sensor unit(s) 1403 and/or the input unit(s) 1404 may be in communication with one or more of the control unit(s) 1401, the power unit(s) 1402, the sensor unit(s) 1403, and/or the input unit(s) 1404, and/or may be in communication with another one or more of the control unit(s) 1401, the power unit(s) 1402, the sensor unit(s) 1403, and/or the input unit(s) 1404.

The control unit(s) 1401 may be operable to control, monitor, and/or manage one or more features, functions, and/or operations of the airflow control devices 405, the metamaterial 550, the motor(s) 1150, the power unit(s) 1402, and/or the sensor unit(s) 1403. The control unit(s) 1401 may be operable to read, write, send, receive, interpret, execute, manage, store, delete, and/or translate machine readable language, code, data, information, commands, executables, programs, inputs, outputs, and/or signals. Examples of a control unit 1401 include, without limitation, a processing unit, a control unit, a microcontroller, a field-programmable gate array, and/or an application specific integrated circuit.

The input unit(s) 1404 may be operable to control, monitor, and/or manage one or more features, functions and/or operations of the airflow control devices 405, the metamaterial 550, the motor(s) 1150, the power unit(s) 1402, and/or the sensor unit(s) 1403. The input unit(s) 1404 may be carried by and/or mounted on the pack unit 1112, and in some embodiments of the present invention, the input unit(s) 1404 may be carried by and/or mounted on one or more of a handle member 1111 that may extend from the pack unit 1112. The input unit(s) 1404 may be operable to read, register, sense, detect, intake, and/or identify one or more user inputs made thereon. For example, the input unit(s) 1404 may comprise, without limitation, one or more of a button, dial, knob, switch, touchscreen device, input keys, and/or any other input device/component as may be understood by those who may have skill in the art.

The input unit(s) 1404 may be operable to generate and emit an input signal based on a user input made via the input unit(s) 1404. The control unit(s) 1401 may be operable to receive the input signal, and the control unit(s) 1401 may be operable to control one or more of the airflow control devices 405, the metamaterial 550, the motor(s) 1150, the power unit(s) 1402 and/or the sensor unit(s) 1403 to take a predetermined action and/or maintain a predetermined action, based on the input signal. More details on the input unit(s) 1404, the control unit(s) 1401, and the predetermined actions follows further below.

The sensor unit(s) 1403 may be operable to sense, detect, determine, and/or monitor one or more predetermined statuses of the system 100, one or more of the components and/or features of the system 100 described herein, and/or of an outside environment. The predetermined statuses may include, without limitation, air pressure, altitude, wind speed, ground speed, temperature, directional heading, geo-location, latitude, longitude, distance above ground level, distance above sea level, acceleration, gravitational force, distance between the system 100 and a predetermined location, orientation, a power level of the power unit(s) 1402, and/or a power consumption of the airflow control device(s) 405 and/or of the motor(s) 1150.

The sensor unit(s) 1403 may be operable to emit a sensor signal responsive to and/or associated with one or more of the predetermined statuses sensed by the sensor unit(s) 1403. The control unit(s) 1401 may be operable to receive the sensor signal, and the control unit(s) 1401 may be operable to control one or more of the airflow control devices 405, the metamaterial 550, the motor(s) 1150, the power unit(s) 1402 and/or the sensor unit(s) 1403 to take a predetermined action and/or maintain a predetermined action, based on the sensor signal. In some embodiments of the present invention, the control unit(s) 1401 may also be operable to control one or more of the airflow control devices 405, the metamaterial 550, the motor(s) 1150, the power unit(s) 1402 and/or the sensor unit(s) 1403 to take a predetermined action and/or maintain a predetermined action, based on both the sensor signal and the input signal. Also, in some embodiments of the present invention, the input unit(s) 1404 may comprise a display. The input unit(s) 1404 may be operable to receive the sensor signal, and the input unit(s) 1404 may be operable to display data and/or information related to and/or based on the sensor signal.

The power unit(s) 1402 may be operable to store and/or provide power to the system 100, the control system 1400, the airflow control device(s) 405, and/or to the control circuitry 610. The power unit(s) 1402 may be operable to be controlled, monitored, and/or managed by the control unit(s) 1401 and/or the input unit(s) 1404, such that, the control unit(s) 1401 and/or the input unit(s) 1404 may monitor, manage, and/or control the application, amount, and/or level power stored and/or provided by the power unit(s) 1402. The power unit(s) 1402 may comprise, without limitation, one or more of a power storage device, battery, a capacitor, an inductor, a supercapacitor, a power regulator, a voltage regulator, an amperage regulator, a fuse, a breaker, and/or a voltage converter.

As described above, the control circuitry 610 of the control system 1400 may be mount on and/or carried by various components, positions, and/or locations of the system 100. In some embodiments of the present invention, the one or more power unit(s) 1402 may be carried by, mounted on, and/or positioned adjacent to one of the airflow control device(s) 405. As such, power losses from power provided from the power unit(s) 1402 to the airflow control device(s) 405 caused by losses based on the distance of communication between the power unit(s) 1402 and the airflow control device(s) 405 may be minimized, reduced, and/or eliminated.

Now referring to FIGS. 5-9 and 14, embodiments of the present invention may include one or more of the airflow control devices 405. The airflow control devices 405 may be carried within an interior area of the parachute body 101. One or more of the airflow control devices 405 may be positioned within the edge airfoils 145. The airflow control devices 405 may be positioned between the proximal edge 120 of the airfoil surface members 105, 110 and the distal edge 315. Each airflow control device 405 may be positioned extending between a pair of the interior wall members 135.

The airflow control devices 405 may each comprise a plurality of conductors 505, and the airflow control devices 405 may each comprise a housing 605. The housings 605 may house each of the conductors 505, and the conductors 505 may extend through an interior area of the airflow control devices 405 and/or housing(s) 605. Although the housings 605 are illustrated as having an arch shaped upper portion, it is contemplated that the housings 605 may have any geometric shape as may be understood by those who may have skill in the art, such as, and without limitation, a cube, a rectangular prism, a triangular prism, a cylinder, a hexagonal prism, and/or a sphere.

Each airflow control device 405 may include airflow openings 510. The airflow openings 510 may extend through one or more lower portions of the airflow control device 405 and/or housing 605 such that the interior area of the airflow control device 405 and/or housing 605 may be in fluidic communication with an outside environment. An airflow opening 510 may be positioned adjacent to a first end of the airflow control device 405 and/or housing 605, and another airflow opening 510 may be positioned adjacent to a second end of the airflow control device 405 and/or housing 605 opposite the first end. For the purposes of the description of the present invention, without limitation, the terms "proximal airflow opening 510" may refer to the airflow opening 510 adjacent the first end of the airflow control device(s) 405/housing(s) 605, and the terms "distal airflow opening 510" may refer to the airflow opening 510 adjacent the second end opposite the first end, with the proximal airflow opening 510 being relatively nearer to the proximal edge 120 of the airfoil surface members 105, 110 than the distal airflow opening 510.

Without limitation, although the drawings show multiple airflow control devices 405 that each include its own housing 605, and/or that each airflow control device 405 is extending between the interior wall members 135 of an edge airfoil 145, it is contemplated that some embodiments of the present invention may include a single extended airflow control device 405 and/or multiple extended airflow control devices 405 that may extend through a plurality of the edge airfoils 145 and/or extend through one or more of the interior wall members 135.

The conductors 505 may be in communication with one or more of the control circuitry 610 and/or the control system 1400, such as, and without limitation, with the control unit(s) 1401, the power unit(s) 1402, and/or the sensor unit(s) 1403. The conductors 505 may comprise a conductive material. One or more of the conductors 505 may comprise, without limitation, a wire of conductive material as illustratively shown in FIG. 8. Also, without limitation, one or more of the conductors 505 may comprise a film of conductive material as illustratively shown in FIG. 8.

Within each of the edge airfoils 145, one or more first conductors 505 may be positioned therein, and one or more second conductors 505 may also be positioned therein at a position distal the first conductor(s) 505. The conductors 505 may be operable to receive power from the control circuitry 610 and/or from one or more of the power unit(s) 1402. The control circuitry 610 and/or the power unit(s) 1402 may be configured and/or operable to positively charge one or more of the first conductor(s) 505 and/or second conductor(s) 505. Also, the control circuitry 610 and/or the power unit(s) 1402 may be configured and/or operable to negatively charge one or more of another one of the first conductor(s) 505 and/or second conductor(s) 505.

The positively charged first conductor(s) 505 may cause air particles adjacent to the first conductor(s) 505 to become ionized. The ionized air particles may cause a repellant force between themselves and the first conductor(s) 505, and/or the ionized air particles may cause an attraction force between themselves and the negatively charged second conductor(s) 505. The repellant force and/or the attraction force may cause a distal flow of air into and out from the edge airfoil 145, the airflow control device 405 and/or the housing 605. Also, the repellant force and/or the attraction force may cause a flow of air 650a into the proximal airflow opening 510 from an outside environment and cause a flow of air 650b out from the distal airflow opening 510 into the outside environment.

The distal flow of air and/or the flow of air 650a, 650b caused by the conductors 505 may generate an ionic thrust 650i, 650j against the system 100, the parachute body 101, and/or the airflow control devices 405 which may cause an upward directional force 650j and/or forward directional force 650i to be applied against the system 100, the parachute body 101, and/or the airflow control devices 405. It is contemplated that the embodiments of the present invention may include any number of conductors 505, comprising at least one conductor 505 to be positively charged and at least on of another conductor 505 to be negatively charged.

Figure 4:
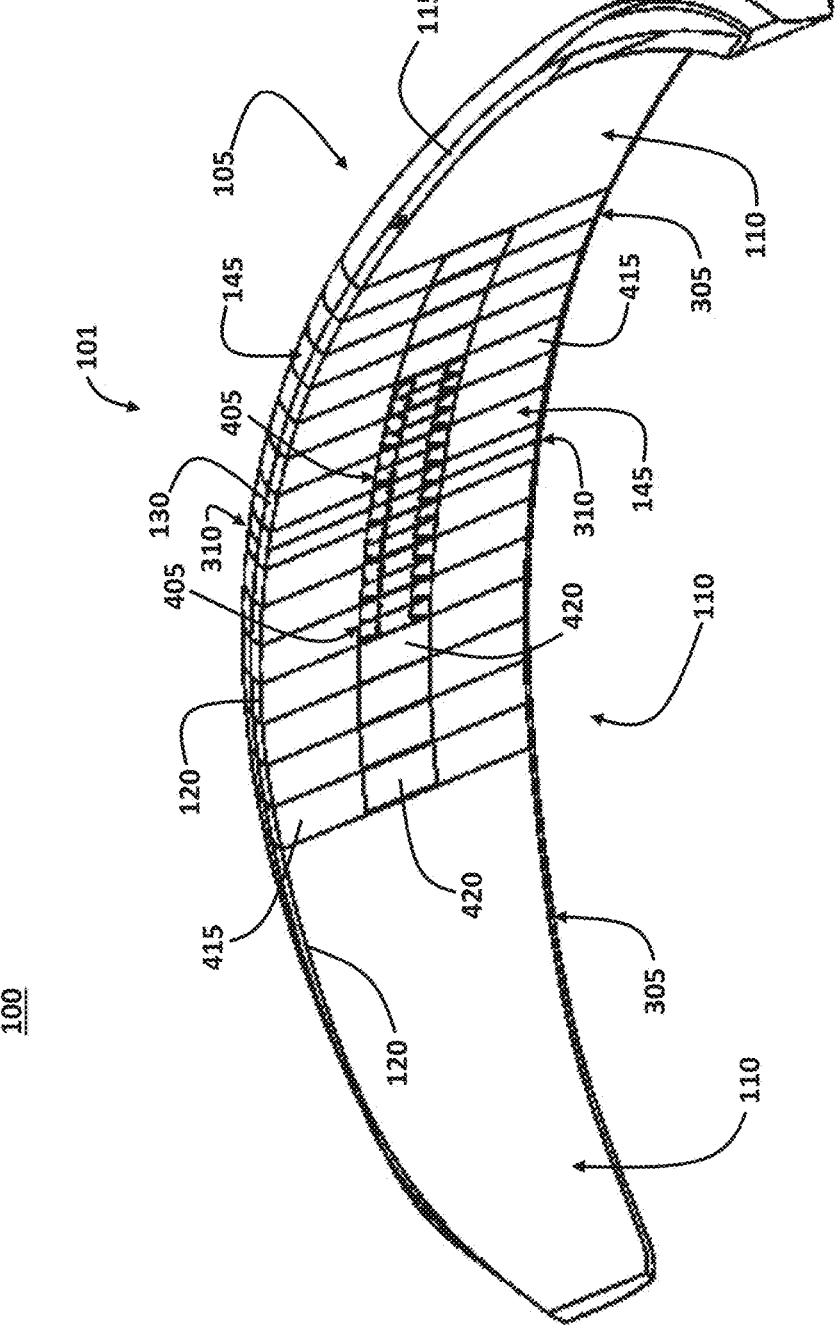
FIG. 4 is a lowered perspective view of the parachute system according to FIG. 1.
Figure 10:
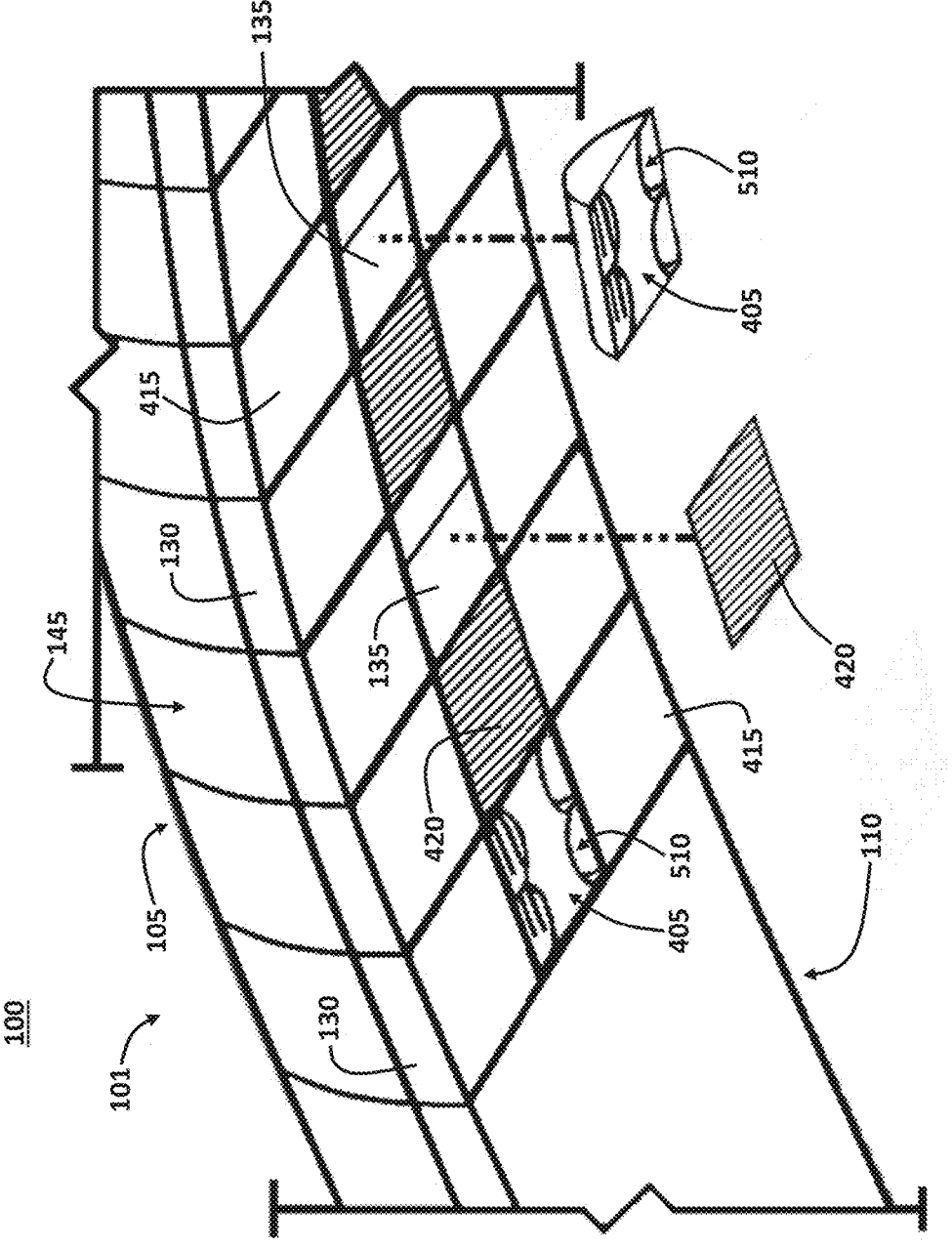
FIG. 10 is a partial front-bottom view of a parachute system according to an embodiment of the present invention, shown with detachable panels.

Now referring to FIGS. 4, and 10, in some embodiments of the present invention the parachute body 101 and/or the lower airfoil surface member 110 may include detachable panels 420 and non-detachable panels 415. The non-detachable panels 415 may be attached to a portion of the parachute body 101, the interior wall members 135 and/or the lower airfoil surface member 110, and/or attached to other adjacent non-detachable panel(s) 415, such that, the non-detachable panels 415 may not be readily removed and/or separated from the parachute body 101.

The detachable panels 420 may be removably attached to a lower portion of the parachute body 101, the interior wall members 135 and/or to the lower airfoil surface member 110, and the detachable panels 420 may be removably attached to adjacent non-detachable panels 415 and/or other adjacent detachable panels 420. The detachable panels 420 may have a length and width that may be the same and/or similar to a length and width of the upper and lower airfoil surface members 105, 110. Also, each detachable panel 420 may be removably attached extending between lower portions of a pair of the interior wall members 135 and may be positioned proximate to a longitudinal center of the lower airfoil surface member 110.

The detachable panels 420 may be configured to be removed from the parachute body 101 to allow for an airflow control device 405 to be positioned, carried, attached, and/or mounted proximate where the detachable panel 420 is removed from the parachute body 101. In some embodiments of the present invention, the airflow control devices 405 may also be removably attached to the parachute body 101, such that an airflow control device 405 may be removed from the parachute body 101 and replaced by a detachable panel 420 proximate where the airflow control device 405 was removed from the parachute body 101.

Figure 11:
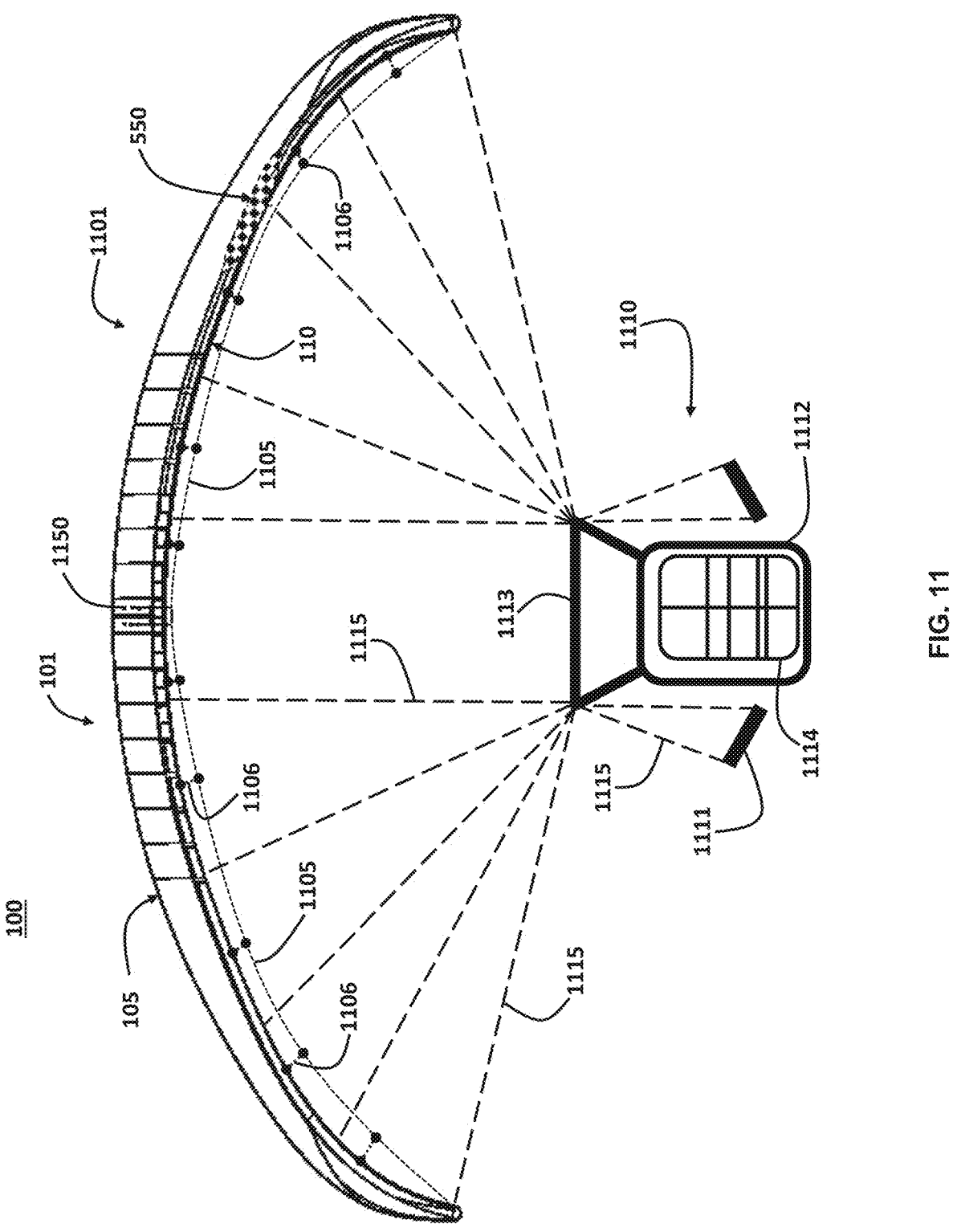
FIG. 11 is a front elevation view of a parachute system according to an embodiment of the present invention, shown with a pack unit and carrying a motor with the parachute body in an inverted-U shape state.
Figure 12:
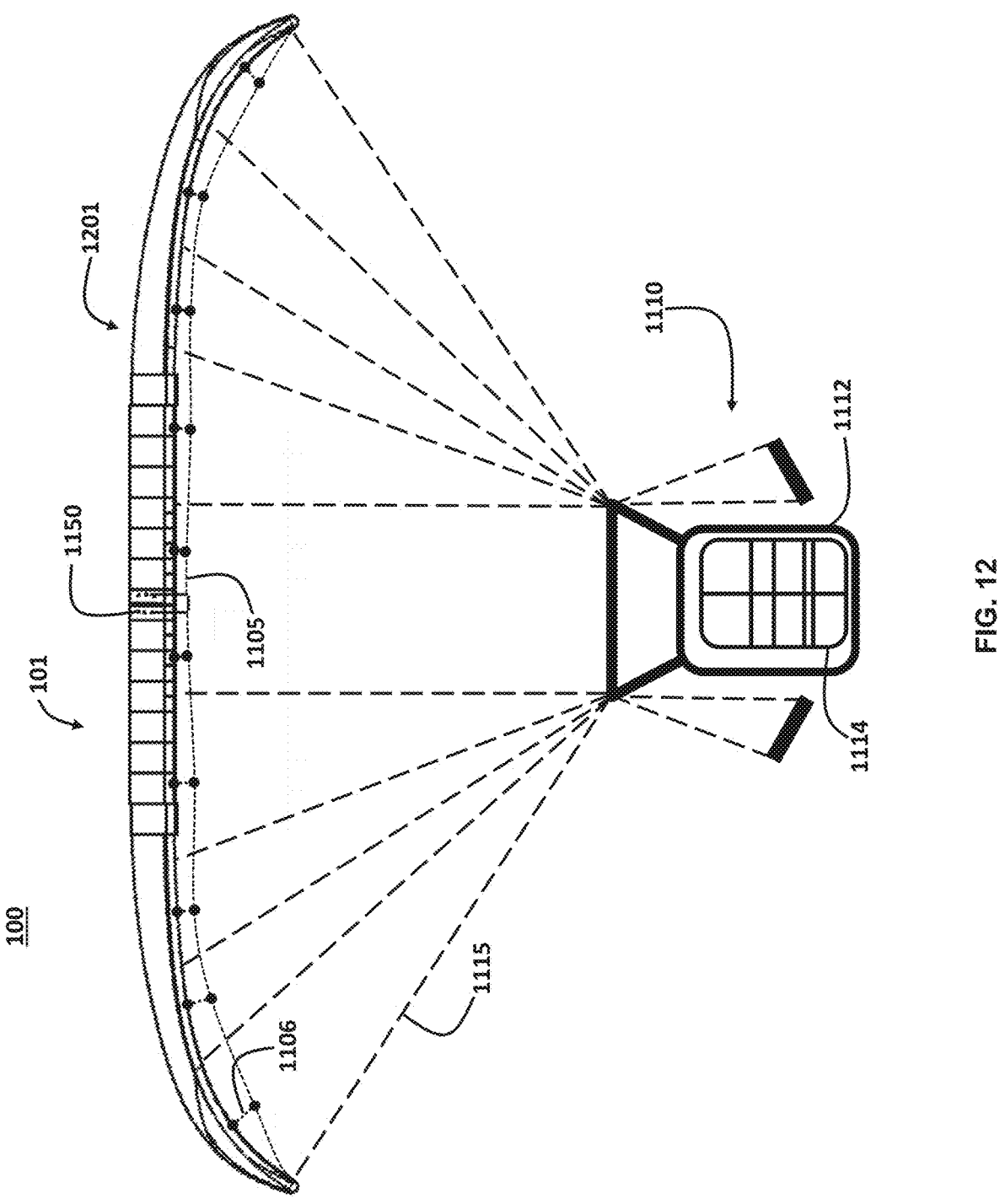
FIG. 12 is another front elevation view of the parachute system according to FIG. 11, with the parachute body shown in an uncontracted state.
Figure 13:
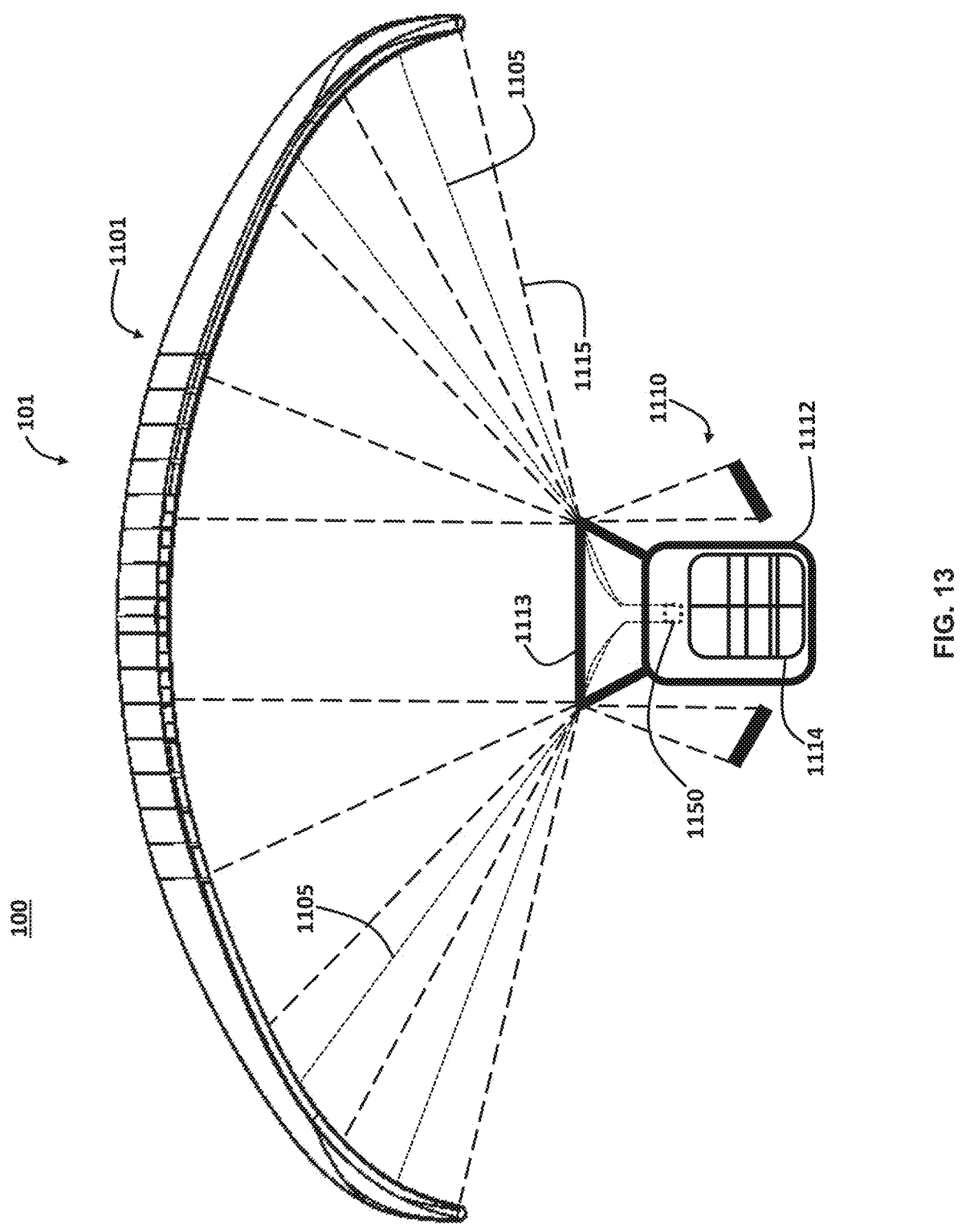
FIG. 13 is a front elevation view of a parachute system according to an embodiment of the present invention, shown with a motor carried by a pack unit.
Figure 14:
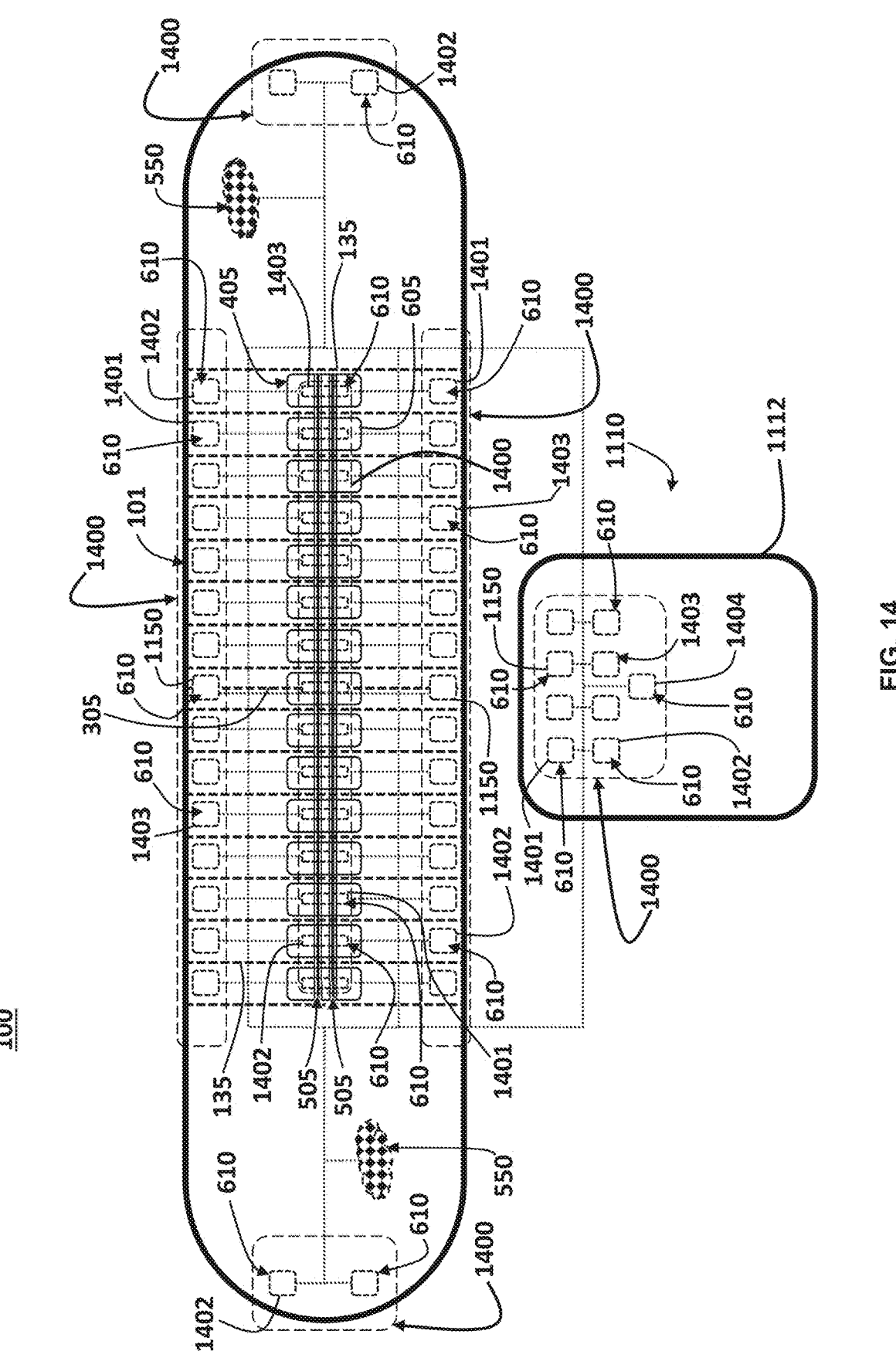
FIG. 14 is a schematic diagram of a parachute system according to an embodiment of the present invention.

Now referring to FIGS. 11-12 and 14, some embodiments of the present invention may include a deployment system 1110. The deployment system 1110 may include a pack unit 1112. The deployment system 1110 and/or the pack unit 1112 may be configured to carry the parachute body 101 within the pack unit 1112, and the deployment system 1110 and/or the pack unit 1112 may be configured to deploy the parachute body 101 out from the pack unit 1112 as may be understood by those who may have skill in the art. The pack unit 1112 may include a harness 1114 configured to be worn by a user of the system 100, as may be understood by those who may have skill in the art. The pack unit 1112 may be attached and/or in communication with the parachute body 101 with a plurality of control lines 1115.

Handle members 1111 may be attached to and/or in communication with one or more of the control lines 1115 at one end of the control lines 1115. Another end of the control lines 1115 may be attached to and/or in communication with portions of the parachute body 101 and/or of the lower airfoil surface member 110. The control lines 1115 may be attached to and/or in communication with a line bridge 1113 attached to and extending from the pack unit 1112. The handle members 1111 may be utilized to manipulate and control the control lines 1115 to manipulate, control, and/or maneuver the parachute body 101 and/or the system 100 upon gliding and/or parachuting with the system 100 as may be understood by those who may have skill in the art.

Some embodiments of the present invention may include one or more of a motor 1150 which may be utilized to move the parachute body 101 between an inverted-U shape state 1101 as illustratively shown in FIG. 11, and an uncontracted state 1201 as illustratively shown in FIG. 12. The motor(s) 1150 may be carried by the parachute body 101, the upper airfoil surface member 105, the lower airfoil surface member 110 and/or one or more of the detachable panels 420 and/or non-detachable panels 415. Also, the motor(s) 1150 may be positioned with one or more of the edge airfoils 145. The motor(s) 1150 may also be carried by the deployment system 1110 and/or the pack unit 1112.

The motor(s) 1150 may be in communication with the parachute body 101 and/or the lower airfoil surface member 110 via one or more motor lines 1105. A first control line 1105 may be attached at a first end to the motor 1150 and at a second end towards a first lateral end of the parachute system 100. A second control line 1105 may be attached at a first end to the motor 1150 and at a second end towards a second lateral end of the system 100 opposite the first lateral end. The motor lines 1105 may be in communication with the parachute body 101 and/or the lower airfoil surface member 110. One or more portions of the motor lines 1105 may be attached to the parachute body 101 and/or the lower airfoil surface member 110. One or more line guides 1106 may be attached to one or more lower portions of the parachute body 101 and/or of the lower airfoil surface member 110. The one or more line guides 1106 may be slidingly coupled and/or engaged with the one or more motor lines 1105 such that the motor lines 1105 may slidingly move along it coupling and/or engagement(s) with the one or more line guides 1106. The motor lines 1105 may having one end thereof attached proximate to one or more side ends of the parachute body 101 and/or the lower airfoil surface member 110.

The motor(s) 1150 may be configured and/or operable to retract one or more portions of the one or more motor lines 1105 towards the motor 1150 to cause a distance between the motor(s) 1150 and the side ends of the parachute body 101 and/or of the lower airfoil surface member 110 to decrease to an inverted-U shape distance to cause the parachute body 101 to be moved to the inverted-U shape state 1101. The motor(s) 1150 may also be configured and/or operable to release one or more portions of the motor lines 1105 from the motor 1150 to cause the distance between the motor(s) 1150 and the side ends of the parachute body 101 and/or of the lower airfoil surface member 110 to decrease to an uncontracted distance, and to cause the parachute body 101 to be moved to the uncontracted state 1201.

The motor(s) 1150 may be configured and/or operable to retract and/or release one or more portions of the motor lines 1105 to move the parachute body 101 between the inverted-U shape state 1101 and the uncontracted state 1201, and/or to selectively contract and expand the edges of the system 100 and/or parachute body 101 towards and away from a central axis of the system 100/body 101 to move the parachute body 101 between the inverted-U shape state 1101 and the uncontracted state 1201, which may be responsive to an input signal and/or a control signal received from the control unit(s) 1401 and/or the input unit(s) 1404. The motor(s) 1150 may also be configured and/or operable to perform a flapping procedure which may include periodically retracting and/or releasing one or more portions of the motor lines 1105 so that the parachute body 101 may be alternated between being in the inverted-U shape state 1101 and the uncontracted state 1201 with predetermined period (s) of time therebetween. The flapping procedure performed by the motor(s) 1150 may cause and upward directional force 650*j* to be applied to the parachute body 101 and/or the system 100 by the movement of the parachute body 101 from the uncontracted state 1201 to the inverted-U shape state 1101.

Figure 5:
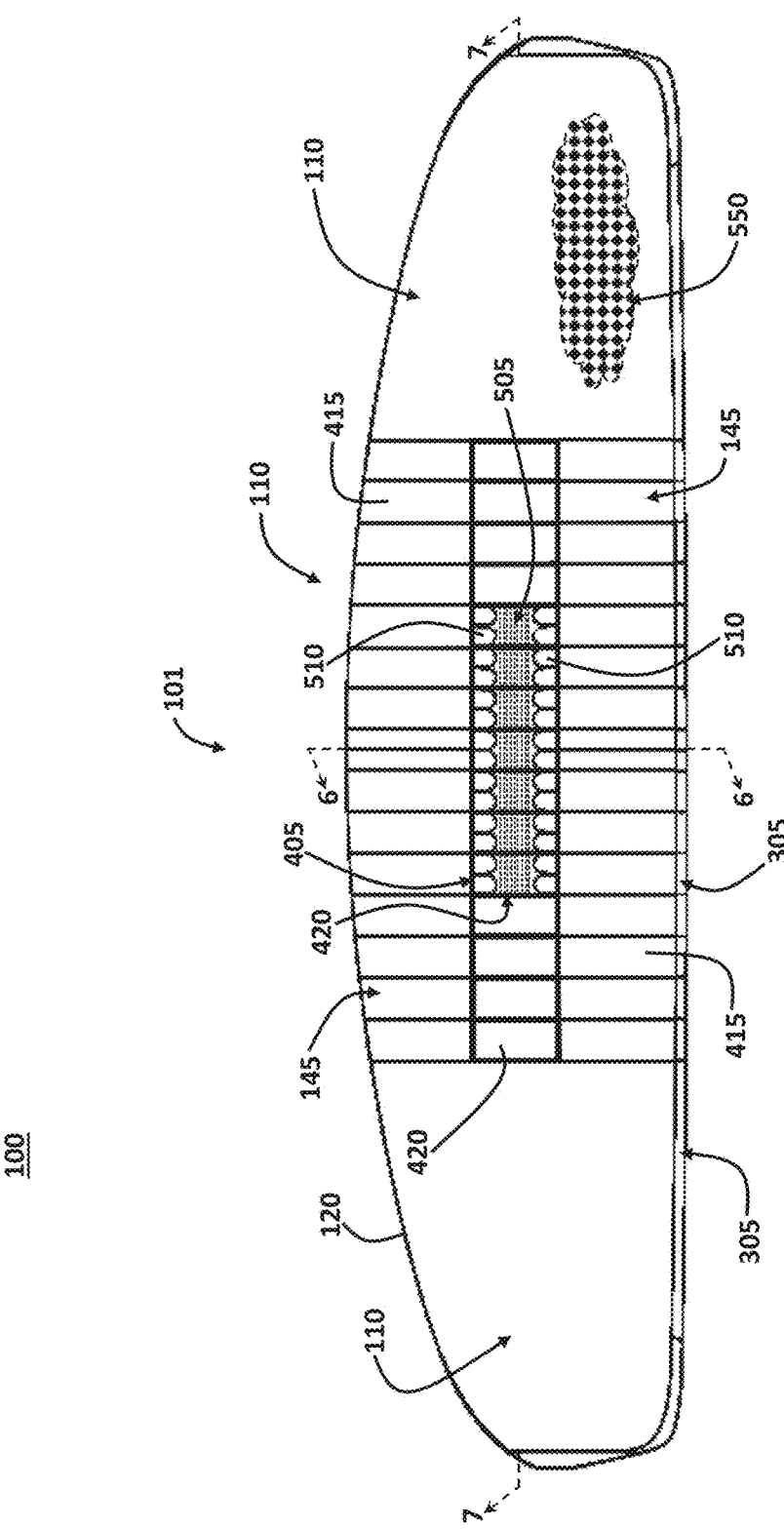
FIG. 5 is a bottom plan view of the parachute system according to FIG. 1, showing the parachute body comprising a metamaterial.
Figure 6:
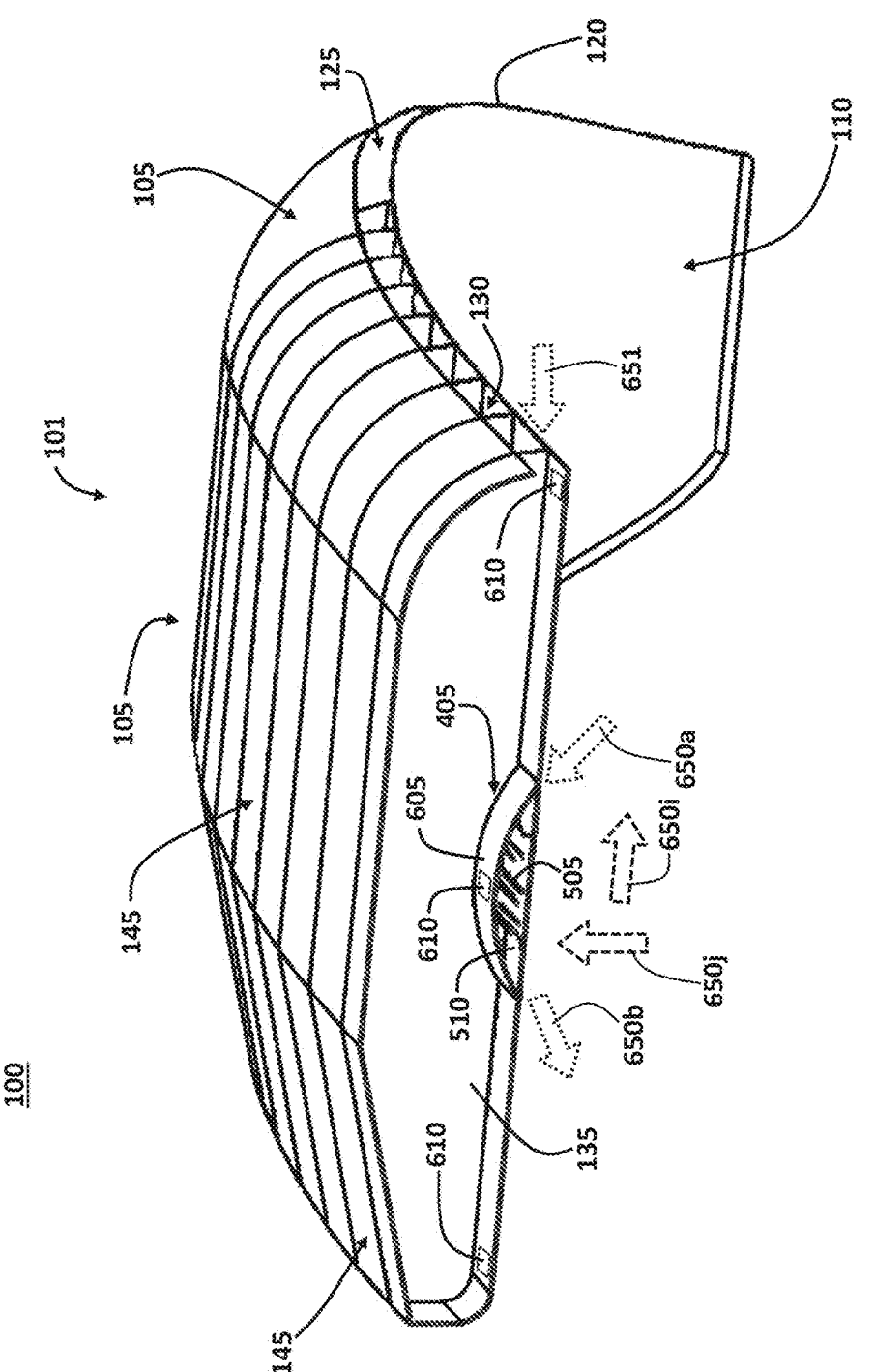
FIG. 6 is a perspective sectional view of the parachute system according to FIG. 5.
Figure 7:
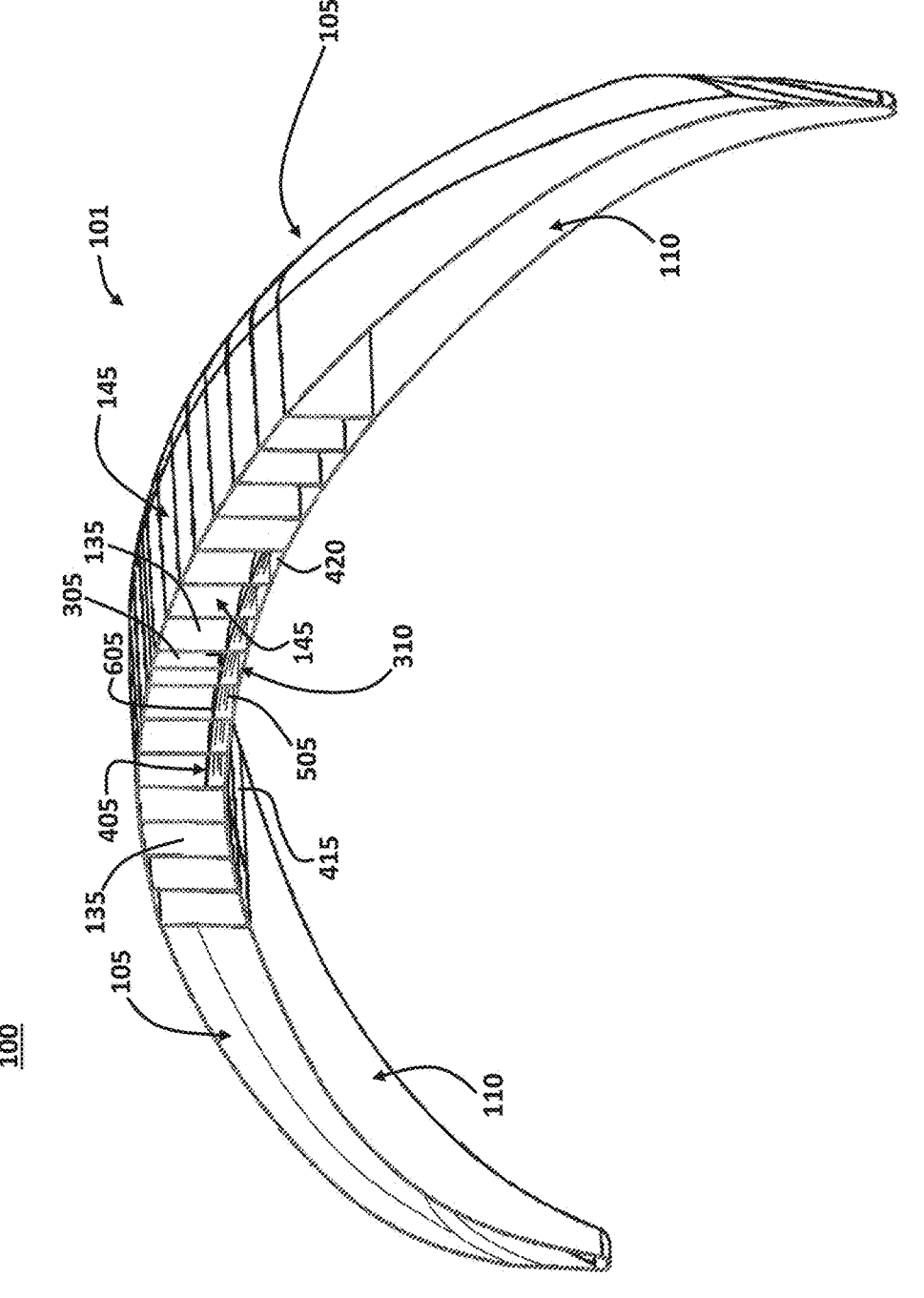
FIG. 7 is another perspective sectional view of the parachute system according to FIG. 5.
Figure 8:
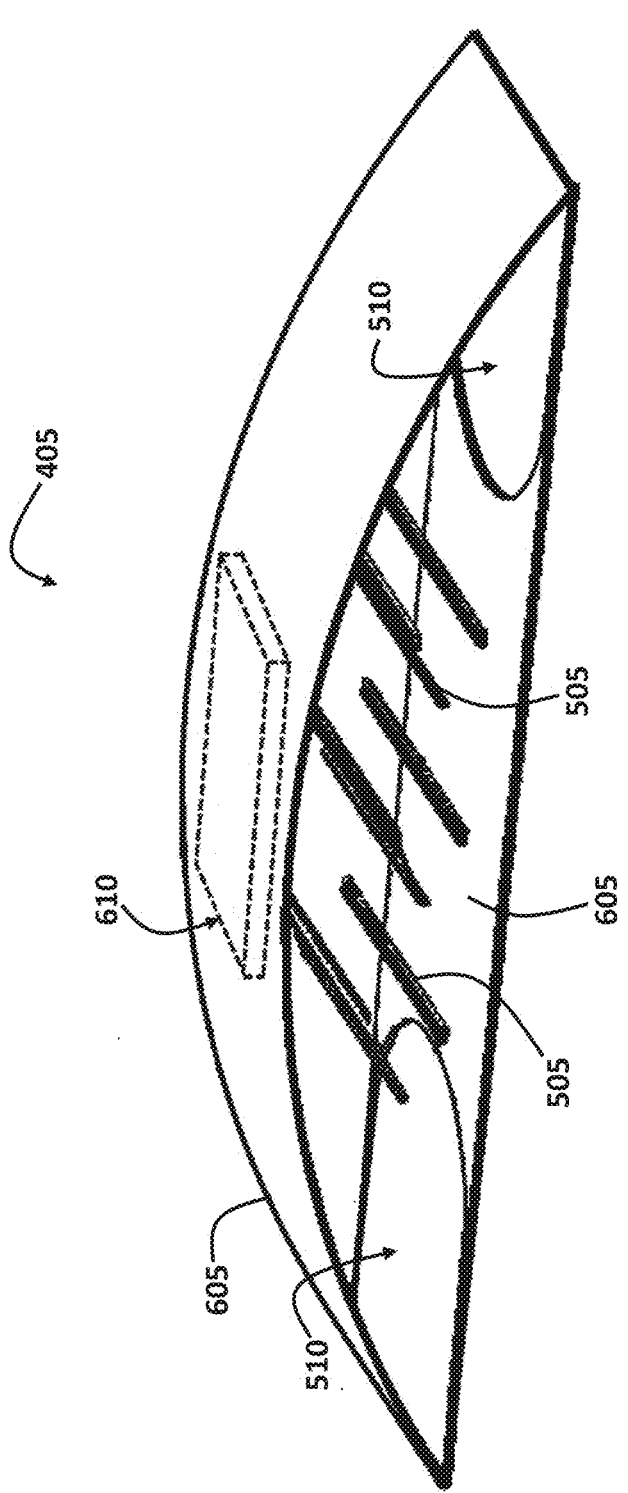
FIG. 8 is a perspective view of an airflow control device according to an embodiment of the present invention.
Figure 9:
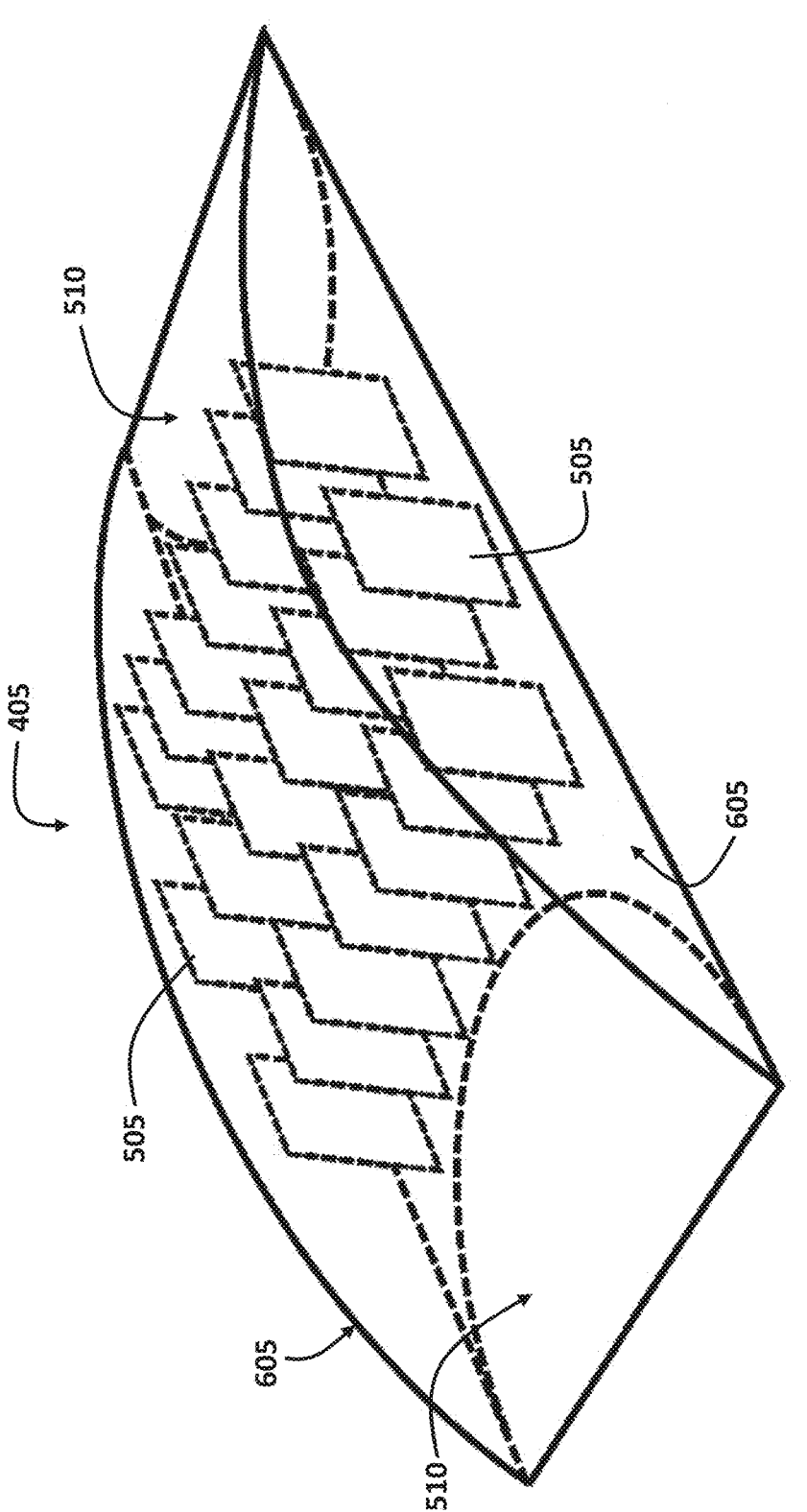
FIG. 9 is a perspective view of an airflow control device according to an embodiment of the present invention, shown with vertically arranged conductors.

Now additionally referring to FIG. 5, in some embodiments of the present invention one or more portions of the parachute body 101 and/or the lower airfoil surface member 110 may comprise a metamaterial 550. The metamaterial 550 may be configured and/or operable to contract its volume and/or surface area upon and/or responsive to receiving and/or being subjected to a retraction power that comprises a predetermined power amount and/or a predetermined electrical power amount. As such, the metamaterial 550 may be configured and/or adapted to contract its volume and/or surface area upon and/or responsive to receiving and/or being subjected to the retraction power to cause the metamaterial 550 to move from a first shape having a first volume amount and/or a first surface area amount to a second shape having a second volume amount and/or a second surface area amount that has lower amount(s) than the amount(s) of the first shape.

The metamaterial 550 may be configured and/or adapted to maintain position in the second shape in the second volume/surface amount(s) area so long as and/or while the retraction power is being received by and/or applied to the metamaterial 550. Also, the metamaterial 550 may be configured and/or adapted to return to and/or move to the first shape from the second shape upon the retraction power being removed from and/or not being applied to the metamaterial 550. The metamaterial 550 may remain its shape in the first shape when and/or while the retraction power is not being received by and/or applied to the metamaterial 550. The metamaterial 550 include, for example, and without limitation, one or more of a shape memory fabric, a shape memory alloy, a piezoelectric material, an electroactive polymer, an ionic polymer-metal composite, and/or a dielectric elastomer. In some embodiments of the present invention, the lower airfoil surface member 110 may comprise one or more layers of fabric that may each comprise and/or incorporate the metamaterial 550 therein. In some other embodiments of the present invention, the lower airfoil surface member 110 may comprise one or more layers of fabric, with only one or more layers of the fabric comprising and/or incorporating the metamaterial 550. In yet some other embodiments of the present invention, one or more sections of the lower airfoil surface member 110 may comprise and/or incorporate the metamaterial 550.

The movement of the metamaterial 550 to the second shape from the first shape may cause the parachute body 101 and/or the lower airfoil surface member 110 to move from the uncontracted state 1201 to the inverted-U shape state 1101, and the movement of the metamaterial 550 from the second shape to the first shape may cause the parachute body 101 and/or the lower airfoil surface member 110 to move from the inverted-U shape state 1101 to the uncontracted state 1201. As such, the movement of the metamaterial 550 between the first state and the second state may cause the parachute body 101 and/or the lower airfoil surface member 110 to move between the uncontracted state 1201 and the inverted-U shape state 1101.

The metamaterial 550 may be in communication with one or more of the control system 1400 and/or of the control circuitry 610, such as, and without limitation, the metamaterial 550 may be in communication with one or more of the control unit(s) 1401, the power unit(s) 1402 and/or the input unit(s) 1404. The input unit(s) 1404 may generate and emit an input signal responsive to a user input to be received by the control unit(s) 1401 and/or the power unit(s) 1402. The power unit(s) 1402 may receive and be responsive to the input signal to generate, provide, and/or send the retraction power to the metamaterial 550. The power unit(s) 1402 may also be responsive to the input signal to cease generating, providing, and/or sending the retraction power to the metamaterial 550.

The control unit(s) 1401 may be responsive to the input signal to generate and send a control signal to one or more of the power unit(s) 1402, with the control signal being generated by the control unit(s) 1401 based on the input signal and/or based on the input signal and one or more of the sensor signal(s). The power unit(s) 1402 may receive and be responsive to the control signal to generate, provide, and/or send the retraction power to the metamaterial 550, and/or the power unit(s) 1402 may be responsive to the control signal to cease generating, providing, and/or sending the retraction power to the metamaterial 550. The control unit(s) 1401 may be configured and/or adapted to control one or more of the power unit(s) 1402 to alternate between providing the retraction power to the metamaterial 550 and not and/or stop providing the retraction power to the metamaterial 550 with predetermined period(s) of time therebetween, to cause the parachute body 101 and/or the lower airfoil surface member 110 to alternate between and/or alternate moving between the inverted-U shape state 1101 and the uncontracted state 1201.

Figure 15:
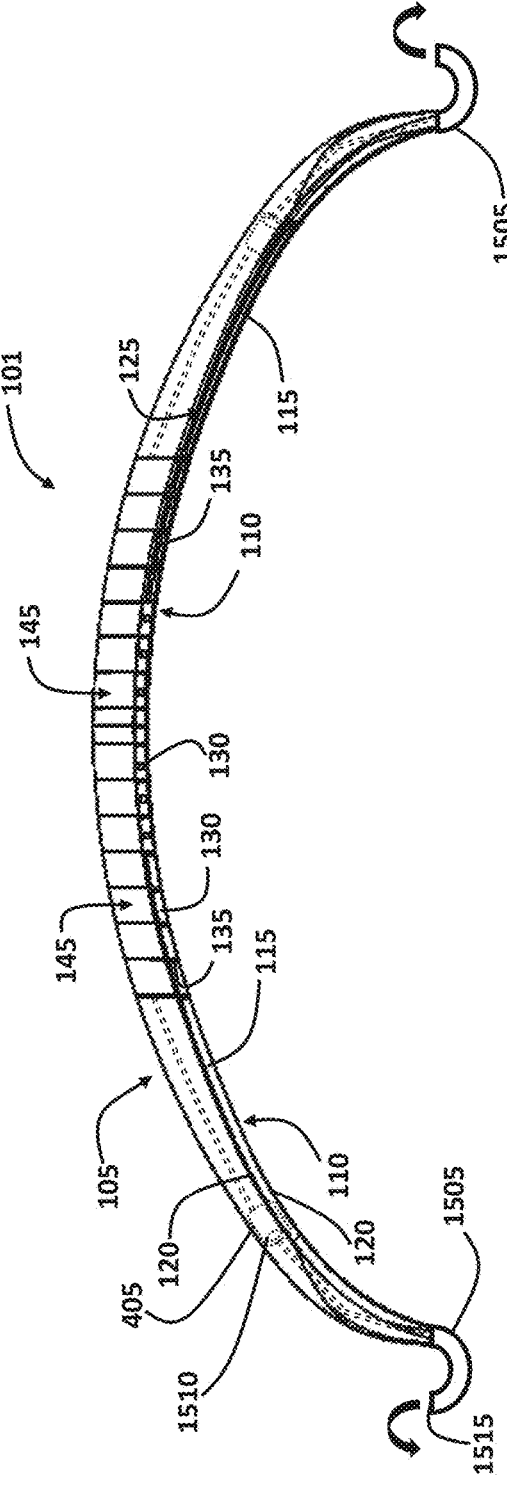
FIG. 15 is a front face elevation of a parachute system according to an embodiment of the present invention, shown with winglets.

Now referring to FIGS. 14 and 15, some embodiments of the present invention may include one or more winglets 1505. A first winglet 1505 may be positioned at a first lateral end of the parachute system 100 and/or parachute body 101. A second winglet 1505 may be positioned at a second lateral end of the parachute system 100 and/or parachute body 101. One or more of the edge airfoils 145 may be in communication and/or fluidic communication with one or more of the winglets 1505 to selectively permit and/or permit air to flow into the one or more winglets 1505. One or more of the airflow control devices 405 may be positioned in fluidic communication with one or more of the winglets 1505 to selectively permit, allow, and/or provide a flow of air into the winglets 1505 from the edge airfoils 145 and/or from the airflow control devices 405 and/or conductors 505.

In some embodiments of the present invention, one or more airflow control devices 405 may be positioned within the parachute body 101 proximate to one or more of the winglets 1505. The airflow control device 405 proximate a winglet 1505 may be configured to receive air via one or more of the airflow openings 510 of the airflow housing 605, and/or the airflow control device 405 may be in communication with one or more of the edge airfoils 145 to received a flow of air therefrom. The airflow control devices 405 proximate a winglet 1505 may include a side outlet 1510 that may be in fluidic communication with a winglet 1505 to selectively permit air to flow into the winglet 1505 from the airflow control device 405.

The winglets 1505 may extend from the lateral ends of the system 100 and/or parachute body 101. The winglets 1505 may be utilized to cause a reduction in drag on the system 100 when used as a parachute by mitigating wingtip vortices due to the winglets 1505 having an upward-U shape. In some embodiments of the present invention, the winglets 1505 may include an outflow opening 1515. Air flow into the winglet 1505 may exit from the winglet 1505 out through the outflow opening 1515. The flow of air exiting the outflow opening 1515 may further mitigate wingtip vortices and/or drag. Additionally, in some embodiments of the present invention, the airflow control devices 405 may be operable to be controlled by the control unit(s) 1401 and/or the input unit(s) 1404 to selectively cause more and/or less air to flow into one or more of the winglets 1505 and out from the outflow openings 1515 of the winglets 1505 to steer the system 100 and/or to thrust the system 100 in a forward direction.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

What is claimed is:

1. A ram-air parachute system comprising:
upper and lower airfoil surface members;
at least two proximal wall members extending between proximal edges of the upper and lower airfoil surface members, each proximal wall member extending distally and away from a longitudinal center of the parachute system;
at least one distal wall member extending between distal edges of the upper and lower airfoil surface members;
a plurality of interior wall members positioned within a space at least partially bounded by the upper and lower airfoil surface members, the proximal wall members and the at least one distal wall member, the interior wall members being positioned distal to one of the proximal wall members and extending distally and away from the longitudinal center of the parachute system; and
a plurality of proximal-facing air inlets defined between the interior wall members and the upper and lower airfoil surface members;
wherein a plurality of edge airfoils are defined between the proximal wall members and at least a portion of the upper airfoil surface member, the lower airfoil surface member and the at least one distal wall member;
wherein the edge airfoils are in fluidic communication with the proximal-facing air inlet such that air may flow into the edge airfoils via the proximal-facing air inlet and inflate the edge airfoils; and
wherein inflation of the edge airfoils vertically expands the parachute system, increasing a vertical distance between the upper and lower airfoil surface members.

2. The ram-air parachute system of claim 1, further comprising least one central wall member positioned within a space at least partially bounded by the upper and lower airfoil surface members and a distal portion of the interior wall member, at least a portion of the central wall members being positioned distal to one of the proximal wall members and extending distally and substantially parallel to the longitudinal center of the parachute system;
wherein a central airfoil is defined between the adjacent proximal wall members and at least a portion of the central wall members, the upper airfoil surface member, and the lower airfoil surface member; and
wherein the central airfoil is in fluidic communication with the proximal-facing air inlet such that air may flow into the central airfoil via the proximal-facing air inlet and inflate the edge airfoils; and
wherein inflation of the edge airfoils facilitates vertically expanding the parachute system in conjunction with inflation of the edge airfoils.

3. The ram-air parachute system of claim 1, further comprising:
a first conductor positioned within an edge airfoil of the plurality of edge airfoils; and
a second conductor positioned within the same edge airfoil as the first conductor at a position distal the first conductor; and
control circuitry connected to each of the first and second conductors and configured to positively charge the first conductor and negatively charge the second conductor; and
wherein air particles adjacent to the first conductor are ionized by the positive charging thereof and attracted to the second conductor by the negative charging thereof, creating a distal flow of air into and out of the edge airfoil.

4. The ram-air parachute system of claim 3, wherein each edge airfoil of the plurality of edge airfoils comprises a first conductor, a second conductor, and control circuitry.

5. The ram-air parachute system of claim 3, wherein:
the first conductor is a wire of conductive material; and
the second conductor is a film of conductive material.

6. The ram-air parachute system of claim 3, further comprising an airflow housing positioned within the same edge airfoil as the first and second conductors;
wherein the first conductor and the second conductor are housed by the airflow housing.

7. The ram-air parachute system of claim 6, wherein each airflow housing comprises at least two airflow openings positioned extending from an interior area of the airflow housing through a lower portion of the airflow housing;
wherein one of the airflow openings is proximate to a first end of the airflow housing; and
wherein another one of the airflow opening is proximate to a second end of the airflow housing.

8. The ram-air parachute system of claim 3, further comprising:
a third conductor positioned within the same edge airfoil as the first and second conductors at a position distal the second conductor; and
a fourth conductor positioned within the same edge airfoil as the first, second, and third conductors at a position distal the third conductor; and
wherein the control circuitry is further configured to positively charge the third conductor and negatively charge the fourth conductor;
wherein air particles adjacent to the third conductor are ionized by the positive charging thereof and attracted to the fourth conductor by the negative charging thereof, supplementing the distal flow of air into and out from the edge airfoil.

9. The ram-air parachute system of claim 8, further comprising an airflow housing positioned within the same edge airfoil as the first, second, third, and fourth conductors;
wherein the first, second, third, and fourth conductors are housed by the airflow housing.

10. The ram-air parachute system of claim 9, further comprising:
first conductors positioned within each edge airfoil of the plurality of edge airfoils; and
second conductors positioned within each edge airfoil of the plurality of edge airfoils at a position distal the first conductor; and
control circuitry connected to each of the first and second conductors and configured to positively charge one of the first conductors and the second conductors and negatively charge the other of the first conductors and the second conductors;
wherein air particles adjacent to the positively-charged conductors are ionized by the positive charging thereof and attracted to the negatively-charged conductors adjacent to the positively-charged conductors by the negative charging thereof, creating a distal flow of air into and out from the plurality of edge airfoils and the central airfoil.

11. The ram-air parachute system of claim 1, wherein:
the lower airfoil surface member comprises at least one detachable panel; and
detachment of the at least one detachable panel creates at least one opening in the lower airfoil surface member to permit at least one of installment and removal of at least one airflow control device within at least one of the plurality of edge airfoils.

12. The ram-air parachute system of claim 1, wherein the lower airfoil surface member is fabricated at least partially from a metamaterial configured to contract when a current is applied thereto, the parachute system further comprising control circuitry operable to selectively temporarily apply current to the lower airfoil surface member to cause the lower airfoil surface member to contract, thereby imparting an inverted-U shape to the parachute system, and then cease applying current, permitting the lower airfoil surface member to return to its uncontracted state.

13. The ram-air parachute system of claim 1, further comprising:
a motor;
a first control line attached at a first end to the motor and at a second end towards a first lateral end of the parachute system;
a second control line attached at a first end to the motor and at a second end towards a second lateral end of the parachute system opposite the first lateral end;
wherein the motor is operable selectively retract each of the first and second control lines, thereby applying a downward force on the lateral ends of the parachute system to impart an inverted-U shape, and then release the retracted first and second control lines to permit the parachute system to return to its contracted shape.

14. The ram-air parachute system of claim 1, wherein the distal wall member comprises one or more apertures positioned at a distal end of the plurality of edge airfoils and configured to permit selective venting of air in the edge airfoil adjacent thereto.

15. The ram-air parachute system of claim 1, further comprising:
a first inflatable winglet positioned at a first lateral end of the parachute system;
a second inflatable winglet positioned at a second lateral end of the parachute system; and
a plurality of airflow control devices positioned between one of the first and second inflatable winglets and the edge airfoils adjacent the first and second winglets, the airflow control devices being configured to selectively permit air to flow into the first and second inflatable winglets from the edge airfoil adjacent thereto.

16. A ram-air parachute system comprising:
upper and lower airfoil surface members;
at least two proximal wall members extending between proximal edges of the upper and lower airfoil surface members, each proximal wall member extending distally and away from a longitudinal center of the parachute system;
at least one distal wall member extending between distal edges of the upper and lower airfoil surface members;
at least two interior wall members positioned within a space at least partially bounded by the upper and lower airfoil surface members, each interior wall member being positioned distal to one of the proximal wall members and extending distally and away from the longitudinal center of the parachute system; and
at least one proximal-facing air inlet defined between the interior wall members and the upper and lower airfoil surface members;
a plurality of edge airfoils are defined between the proximal wall members and at least a portion of the interior wall members, the upper airfoil surface member, the lower airfoil surface member and the at least one distal wall member;
a first conductor positioned within each edge airfoil of the plurality of edge airfoils; and
a second conductor positioned within the each edge airfoil of the plurality of edge airfoils at a position distal the first conductor; and
control circuitry connected to each of the first and second conductors and configured to positively charge one of the first conductor and the second conductor and negatively charge the other of the first conductor and the second conductor;
wherein the edge airfoils are in fluidic communication with the proximal-facing air inlet such that air may flow into the edge airfoils via the proximal-facing air inlet and inflate the edge airfoils;
wherein inflation of the edge airfoils vertically expands the parachute system, increasing a vertical distance between the upper and lower airfoil surface members;
wherein air particles adjacent to the positively-charged conductor are ionized by the positive charging thereof and attracted to the negatively-charged conductor by the negative charging thereof, creating a flow of air within the edge airfoil;
wherein the lower airfoil surface member comprises at least one detachable panel; and
wherein detachment of the at least one detachable panel creates an opening in the lower airfoil surface member to permit at least one of installment and removal of the first conductor and the second conductor.

17. The ram-air parachute system of claim 16, further comprising:
at least one central wall member positioned within a space at least partially bounded by the upper and lower airfoil surface members and a distal portion of the interior wall member, at least a portion of the central wall members being positioned distal to one of the proximal wall members and extending distally and substantially parallel to the longitudinal center of the parachute system, defining a central airfoil between the adjacent proximal wall members and at least a portion of the central wall members, the upper airfoil surface member, and the lower airfoil surface member; and
the first and second conductors positioned within the central airfoil, the second conductor being positioned distal the first conductor;
wherein the central airfoil is in fluidic communication with the proximal-facing air inlet such that air may flow into the central airfoil via the proximal-facing air inlet and inflate the edge airfoils;
wherein inflation of the edge airfoils facilitates vertically expanding the parachute system in conjunction with inflation of the edge airfoils; and
wherein the control circuitry is further configured to positively charge one of the first conductors and the second conductors of the central airfoil and negatively charge the other of the first conductors and the second conductors of the central airfoil;
wherein air particles adjacent to the positively-charged conductor of the central airfoil are ionized by the positive charging thereof and attracted to the negatively-charged conductor of the central airfoil adjacent to the positively-charged conductor, creating a flow of air within the central airfoil.

18. The ram-air parachute system of claim 16, further comprising an airflow housing positioned within each edge airfoil of the plurality of edge airfoils;

wherein the first and the second conductors are positioned within the airflow housings.

19. A method of operating a ram-air parachute system that comprises upper and lower airfoil surface members, at least two proximal wall members, at least one proximal-facing inlet, at least two interior wall members, a plurality of edge airfoils defined between the proximal wall members and at least a portion of the interior wall members, the upper airfoil surface member, and the lower airfoil surface member, at least one distal wall member extending between distal edges of the upper and lower airfoil surface members, a first conductor positioned within each edge airfoil of the plurality of edge airfoils, a second conductor positioned within each edge airfoil of the plurality of edge airfoils at a position distal the first conductor, and control circuitry connected to each of the first and second conductors, the method comprising:

polarizing one of the first and second conductors to have a positive polarity, thereby ionizing air particles adjacent thereto;

polarizing the other of the first and second conductors to have a negative polarity, thereby attracting the ionized air particles;

establishing a flow of air in the edge airfoil through polarization of the first and second conductors; and vertically expanding the edge airfoils through air flowing into the proximal-facing inlet and into the edge airfoils, thereby inflating the edge airfoils and increasing a vertical distance between the upper and lower airfoil surface members.

20. The method of claim 19, further comprising performing a flapping procedure of the ram-air parachute system to selectively contract and expand the edges of the ram-air parachute system towards and away from a central axis of the ram-air parachute system.

\* \* \* \* \*